United States Patent [19]
Norton

[11] 3,880,905
[45] Apr. 29, 1975

[54] CONVERSION OF ESTER GROUPS TO HYDROCARBON

[75] Inventor: Richard V. Norton, Wilmington, Del.

[73] Assignee: Sun Ventures Inc., St. Davids, Pa.

[22] Filed: Sept. 17, 1973

[21] Appl. No.: 398,033

[52] U.S. Cl. ....... 260/465 B; 260/290 P; 260/329 R; 260/346.1 R; 260/465 R; 260/668 F; 260/671 R; 260/671 M
[51] Int. Cl. ..................... C07c 15/00; C07c 121/02
[58] Field of Search ......... 260/465 B, 465 R, 668 F, 260/671 R, 671 M

[56] References Cited
UNITED STATES PATENTS
2,901,504   8/1959   Aries................................. 260/465

FOREIGN PATENTS OR APPLICATIONS
737,409   9/1955   United Kingdom

*Primary Examiner*—Lewis Gotts
*Assistant Examiner*—Dolph H. Torrence
*Attorney, Agent, or Firm*—George L. Church; Donald R. Johnson; Paul Lipsitz

[57] ABSTRACT

A process for the conversion of a lower alkyl ester group of an aromatic acid to the lower alkyl group of the ester entity by reacting the aromatic acid ester with ammonia over an acidic dehydration catalyst and in the presence of water.

5 Claims, No Drawings

CONVERSION OF ESTER GROUPS TO HYDROCARBON

The art teaches the reaction of aromatic esters, amides, and acids with ammonia over anhydrous dehydration catalysts at elevated temperatures to form nitriles. For example, German Patent 1,279,020 discloses the conversion of methyl toluate by reaction with ammonia at 340°C over a catalyst of $Al_2O_3$ to yield toluonitrile:

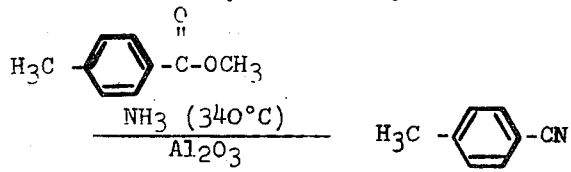

Similarly it is reported by J. Abe (Bull Wasseda Applied Chem. Society, vol. 21, 27–31, 1933) that a Japanese acid clay is an effective dehydrating agent for the preparation of benzonitrile from ethyl benzoate and ammonia at 350°–400°C. Likewise Mitchell and Reid (JACS, vol. 53, 321, 1951) found dehydration catalysts such as boron phosphate, alumina and silica gel to be suitable for the conversion of esters to nitriles in the presence of ammonia. Thus the prior art clearly teaches that esters are readily transformed to nitriles by their reaction with ammonia in the presence of acid dehydration catalyst.

It has now been unexpectedly found, however, that when the same reaction is carried out in the presence of water the products of the reaction are markedly changed and the ester group is converted to a hydrocarbon group. Thus in accord with the invention a lower alkyl ester group of an aromatic acid is converted to the lower alkyl group of the ester entity by reaction of the aromatic acid ester with ammonia over an acidic dehydration catalyst in the presence of water.

The lower alkyl esters of aromatic acids which may be used in the process of the invention may be selected from a wide variety of such esters and will include mono and polyesters particularly those of the benzene and naphthalene series. Included in the term aromatic acids are heterocyclic acids. This language is appropriate since heterocyclic compounds are considered to be superaromatic. This group will include the corresponding esters of nicotinic acid, thiophene acids, acids of furane and the like. It will also be understood that inert substitutes may be present such as halogen, cyano, alkyl, aryl, alkoxy, and the like. The lower alkyl function of the ester may contain from one to about six carbon atoms and thus methyl, ethyl, butyl, pentyl and hexyl esters are readily useful in the process. Typical examples of preferred operable ester starting materials are: methyl benzoate, ethyl toluate, dibutylphthalate, hexylbenzoate, dimethyl terephthalate and the like.

The acid catalyst useful in the process will be any one of the many acidic type dehydration catalysts which are well known in the art, such as, for example, alumina, silica gel, boron phosphate, and the like. If desired, these catalysts may be promoted with phosphoric or sulfuric acid pretreatments as is known in the art. As pointed out, however, it is essential that the reaction be carried out in the presence of water and this is readily accomplished by saturating the catalytic material with moisture prior to initiation of the reaction. Alternatively, but less preferably, water may be included in the reaction stream, but if this technique is used, it is preferable that the catalyst be hydrated somewhat before starting the process.

The process is easily carried out simply by placing the hydrated catalyst in a fixed bed and elevating its temperature to about 200° to about 500°C while passing vapors of of ammonia and the aromatic acid ester over the catalyst in the system. Reaction begins after several minutes and the effluent gases are simply cooled and the product separated by conventional means. Although some by-products are frequently found in the effluent products very little of the nitrile expected from the prior art teachings is found. Where the starting material is a polycarboxylic acid ester the reaction is operable mainly on one acid ester group, the other group being converted to a nitrile in the usual manner. Thus although methyl toluate in the process of this invention will yield paraxylene, dimethyl terephthalate yields mainly toluonitrile. To illustrate this phenomenon further, the following table lists reactants and products which will be obtained.

| Reactant | Product |
|---|---|
| C6H5-COOC2H5 | C6H5-C2H5 |
| H3C-C6H4-COOC2H5 | H3C-C6H4-C2H5 |
| C2H5-C6H4-COOCH3 | C2H5-C6H4-CH3 |
| H3COOC-C10H6-COOCH3 | NC-C10H6-CH3 |
| Cl-C6H4-COOCH3 | Cl-C6H4-CH3 |
| NC-C6H4-COOCH3 | NC-C6H4-CH3 |
| pyridine-COOCH3 | pyridine-CH3 |
| thiophene-COOC2H5 | thiophene-C2H5 |

In order to further illustrate the invention, the following examples are given.

EXAMPLE 1

A stainless steel tubular reactor (1.25 × 19 inches) filled with catalyst in a vertical position is attached to a flask containing boiling dimethyl terephthalate (280°–290°C) through which gaseous ammonia is sparged. The resultant ammonia-dimethylterephthalate gaseous stream is passed upward through the catalyst bed of approximately 16 inches in length. The effluent gases pass from the top of the reactor to a flask immersed in wet ice. Samples are periodically removed for analysis by infrared matching of the peaks collected from a gas chromatograph.

In a typical run using dimethylterephthalate (DMT), alumina (110 g, Houdry 200S) is saturated with water (11.2 g) and charged into the reactor and heated to 250°C with no gas flow. Over the next 2.0 hours, ammonia (40 g, 2.35 moles) is passed through boiling dimethyl terephthalate causing dimethyl terephthalate (18.3 g, 0.08 moles) to react at a ratio of 28.6:1; $NH_3$:DMT. The results of sampling through this 2.0 hour period are given in Table I.

The water (0.62 moles) driven from the alumina was at a mole ratio of 7.6:1 DMT:$H_2O$. During this reaction period, the temperature rose from 240° to 260°C; there was also a steady decrease in the available water left on the catalyst. As a consequence, one notices (Table I) that the p-toluonitrile yield decreases and the make of benzonitrile increases as the availability of water decreases. There is a surprisingly low yield (≈2%) of TPN.

EXAMPLE 2

In the manner of Example 1, but at about 500°C, dimethyl terephthalate (15.7 g, 0.07 moles) reacted with ammonia (32 g, 1.88 moles) over a 3.3 hour period on alumina (110 g) containing water (12 g, 0.668 moles). The mole ratio of $H_2O$:DMT is 9.9 and that of $NH_3$:DMT is 2.69.

At this higher temperature, but slower gas flow rate, a higher yield of p-toluonitrile is obtained with not much decrease in catalyst activity (Table II).

TABLE II

Reaction of Dimethyl Terephthalate with Ammonia on Alumina
Wt. % Nitriles in Effluents

| Sample No. | Reaction Time (min.) | g of Sample | Reactor Temp (°C) | Benzo-nitrile | p-Toluo-nitrile | Methyl p-Cyano-benzoate | Terephthalo-nitrile |
|---|---|---|---|---|---|---|---|
| 1 | 75 | 2.7 | 500 | 70.3 | 29.7 | Trace | Trace |
| 2 | 100 | 1.3 | " | 70.0 | 29.7 | 0.0 | 0.3 |
| 3 | 105 | 0.3 | " | 71.4 | 28.4 | 0.0 | Trace |
| 4 | 120 | 1.9 | " | 66.1 | 33.0 | Trace | 0.8 |
| 5 | 140 | 2.3 | " | 69.4 | 29.3 | 0.0 | 1.1 |
| 6 | 160 | 2.5 | " | 67.4 | 30.2 | 0.0 | 2.1 |
| 7 | 200 | 1.7 | " | 70.6 | 27.2 | 0.0 | 2.3 |

As can be seen from the above data, instead of getting nitrile products as is expected from the prior art, the product is p-toluonitrile with benzonitrile by-product, the latter being obtained due to dealkylation under the reaction conditions.

EXAMPLE 3

In the manner of Example 1 diethyl isophthalate is reacted with ammonia over a phosphoric acid treated silica gel catalyst which is pretreated with steam. p-Cyanoethyl benzene is obtained contaminated with benzonitrile and metacyanoethyl benzoate.

EXAMPLE 4

As in Example 1 meta-cyanomethyl benzoate is reacted over a hydrated alumina catalyst in the presence of ammonia at 300°C and there is obtained a moderate yield of meta-cyanotoluene.

The invention claimed is:

1. A process for the conversion of a lower alkyl ester group of an aromatic acid of the benzene or naphthalene series to the lower alkyl group of said ester by reacting the aromatic acid ester with ammonia at a temperature of from about 200°C to about 500°C over an acidic dehydration catalyst hydrated prior to initiating the process.

TABLE I

Reaction of Dimethyl Terephthalate with Ammonia on Alumina
Wt. % Nitriles in Effluents

| Sample No. | Reaction Time (min.) | g of Sample | Reactor Temp (°C) | Benzo-nitrile | p-Toluo-nitrile | Methyl p-Cyano-benzoate | Terephthalo-nitrile |
|---|---|---|---|---|---|---|---|
| 1 | 5.0 | 3.64 | 201 | only water and DMT | | | |
| 2 | 10.0 | 2.32 | 210 | 78.0 | 20.4 | Trace | 1.6 |
| 3 | 15.0 | 1.88 | 241 | 72.5 | 25.8 | 0.2 | 1.7 |
| 4 | 20.3 | 1.49 | 243 | 69.3 | 29.6 | 0.1 | 1.1 |
| 5 | 34.8 | 0.23 | 249 | 79.1 | 19.2 | 0.0 | 1.7 |
| 6 | 45.0 | 1.25 | 253 | 82.0 | 15.8 | 0.0 | 2.2 |
| 7 | 62.0 | 0.50 | 259 | 83.8 | 15.4 | 0.0 | 0.8 |
| 8 | 90.0 | 0.53 | 258 | 84.5 | 14.8 | 0.0 | 0.7 |
| 9 | 120.0 | 5.84 | 260 | 82.9 | 14.7 | 0.0 | 2.4 |

2. The process of claim 1 wherein the water for the reaction is obtained by saturating the catalyst with moisture prior to carrying out the process.

3. The process of claim 2 where the ester is dimethyl terephthalate and the dehydration catalyst is alumina.

4. The process of claim 2 wherein the ester is diethyl isophthalate and the catalyst is silica gel.

5. The process of claim 2 wherein the ester is m-cyanomethyl benzoate and the catalyst is alumina.

* * * * *